United States Patent [19]
Vasquez

[11] 3,878,974
[45] Apr. 22, 1975

[54] PARTICULATE MATERIAL DISPENSER

[75] Inventor: Ruben S. Vasquez, Gilroy, Calif.

[73] Assignee: Clampco, Incorporated, Salinas, Calif.

[22] Filed: June 26, 1973

[21] Appl. No.: 373,791

[52] U.S. Cl. ............................... 222/342; 222/414
[51] Int. Cl. ............................................ A01c 15/08
[58] Field of Search ........... 222/414, 368, 342, 177, 222/410, 177; 239/669, 681

[56] References Cited
UNITED STATES PATENTS

| | | | |
|---|---|---|---|
| 89,882 | 5/1869 | Nauman | 222/414 X |
| 113,671 | 4/1871 | Hughes | 222/177 |
| 548,690 | 10/1895 | Woodruff | 222/414 |
| 3,035,740 | 5/1962 | Burch | 222/177 X |
| 3,744,725 | 7/1973 | Grataloup | 222/342 X |

Primary Examiner—Stanley H. Tollberg
Assistant Examiner—John P. Shannon
Attorney, Agent, or Firm—Paul Bliven

[57] ABSTRACT

A dispensing unit for particulate, or granular, material is attachable to the outside of a hopper to feed from the hopper a regulated amount of such material. The unit has a plate that secures to such hopper and closes an opening therein. A rotatable and peripherally toothed disc has its plane normal to the plate and extends partially into the hopper thru the plate in a slot therein that closely conforms to the sides of the disc. Outside the hopper, the entrant and emanant (with respect to the hopper) peripheral portions of the disc are shrouded, each by a slotted tube that is C-shaped in cross section, that each has the edges of its slot closely conforming to the sides of the disc, and that, at one end, is attached to the plate. These tubes form entrant and emanant spouts, or chutes whose slots are angularly disposed to and continuations of the plate slot intermediate the ends thereof.

6 Claims, 3 Drawing Figures

PATENTED APR 22 1975

PARTICULATE MATERIAL DISPENSER

FIELD OF THE INVENTION

The present invention relates to a dispenser of particulate material such as systemic materials, inorganic and organic fertilizers, minerals, and other soil additives under field conditions from hoppers carried thru agricultural fields. Further, the invention relates to a such dispenser that employs a peripherally toothed rotatable disc that extends partially into a such hopper thru a slot so that when rotated such disc teeth will move material from the hopper thru such slot for discharge outside of the hopper.

DESCRIPTION OF THE PRIOR ART

In the prior art, there have been peripherally toothed discs extending partially into a hopper for dispensing fertilizer therefrom upon rotation of the disc, but such have not been able to accurately dispense small quantities of particulate material uniformly, such as three to thirty pounds per acre. They have not been able to prevent leakage by such discs of material to be dispensed both while operating in the field or when at rest with fertilizer material filling the hopper. Further, such prior devices have been prone to having the dispensable material adhere to and build up on the sides of the discs to the extent that the discs would bind in their slots and prevent operation of the device until the sides of the slots and the discs were cleaned of the buildup.

Having in mind the above state of the art and the defects of the prior devices, it is an object of the present invention to devise a particulate material dispenser that will meter therethru small quantities of such material at a uniform rate.

It is a further object of the invention to devise means that will prevent leakage of material thru the dispenser.

Also it is an object of the invention to so construct the device that material build up on the sides of the dispensing discs will be materially reduced or eliminated.

SUMMARY OF THE INVENTION

The present invention results from forming a dispenser unit separate from a hopper adapted to contain the material to be dispensed, the unit to be secured to the outside of the hopper to close one or more openings therein adjacent its bottom. This unitizing results in the use of a thin plate to cover the hopper discharge opening. A peripherally toothed disc extends partially thru a slot in such plate. The plane of the disc is normal to the plane of the plate, the side edges of the slot are close to the side faces of the disc, and the disc is supported in bearings secured to the face of the plate away from the hopper, the outer face. Extending from the outer face of the plate and shrouding the entrant and emanant (with respect to the hopper) portions of the disc are tubes that are slotted to be C-shaped in cross section with the edges of the slots closely adjacent the side faces of the disc and being continuations of the edges of the plate slot intermediate the ends thereof. The edges of these slots are relatively thin and the thinner they are the better will they operate to remove buildup from and to prevent build up on the sides of the disc.

The plate of the dispenser unit is secured to the hopper so that its plane is at or nearly vertical, and the disc, or discs, are rotated so that the emanant portion is above the entrant portion. Further, the shrouds are angled with respect to the plate so that the emanant shroud forms a discharge chute that extends outwardly beyond the shaft supporting the disc; and the entrant shroud forms a material trap that stops the leakage of material from the hopper in this area, other than material to initially fill the trap.

BRIEF DESCRIPTION OF THE DRAWINGS

A preferred embodiment of the intention briefly described above is hereinafter described in detail and illustrated in the accompanying drawings, in which.

DESCRIPTION OF A PREFERRED EMBODIMENT

The embodiment herein illustrated is particularly adapted to dispense particulate materials passing thru sieves having openings of ⅛ inch or smaller, and where small constant dispensing rates are necessary. Devices using the present invention can be operated to dispense 3 to 30 pounds per acre. Variations in dispensing rate may be had by changing the dimensions of the unit such as the clearance between the peripheral teeth and the end of the plate slot adjacent the emanant shroud; by changes in the disc thickness; by changes in the size of the spaces between teeth; and by varying the rate of rotation of the disc. Rates up to a thousand pounds per acre are attainable.

Figure 3:
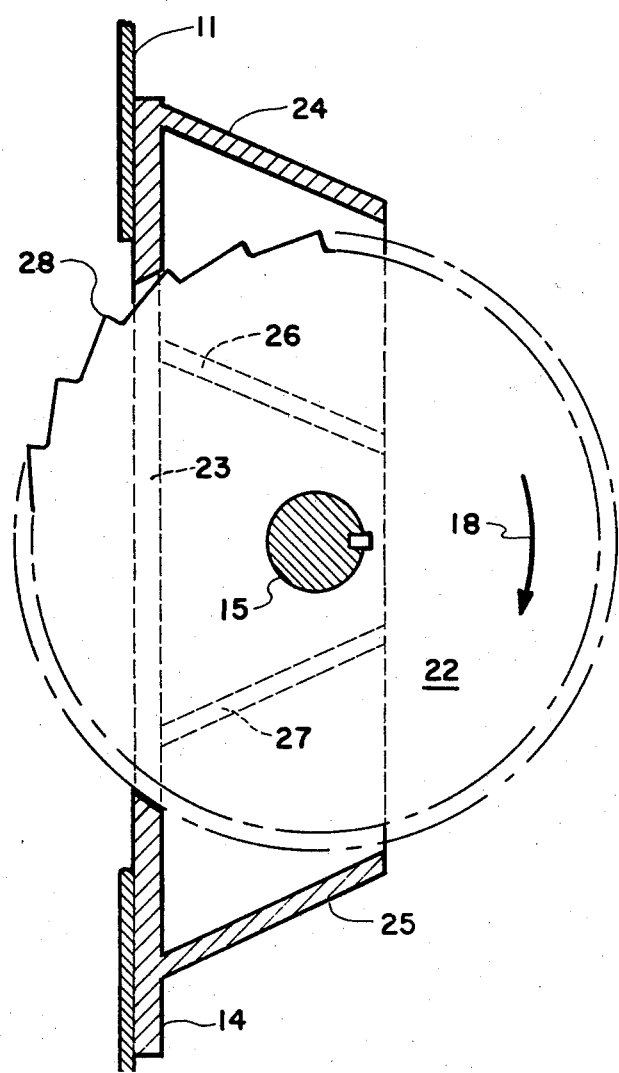
FIG. 3 is side view of the disc taken on the line 3—3 of FIG. 2.

In the illustrated embodiment of the invention, parts of the hopper 11 adjacent the dispenser assembly are shown with the rest of the hopper broken away. In the isometric showing of FIG. 1, there are two dispensing units 12, 13 with the various parts sharing a common plate 14, and a common shaft 15 with its bearings 16, 17 secured to the plate 14. The shaft 15 rotates in the direction indicated by the directional arrow 18 of FIG. 3. Each of the units 12, 13 is identical to the other. Similar parts of the two units will be given the same reference numeral.

The plate 14 is secured to the hopper 11 adjacent the bottom thereof by bolts 19. Each unit 12, 13 comprises a guard funnel 20 removably secured to the plate 14 by four cap screws 21; a peripherally toothed disc 22 keyed to the shaft 15, and partially extending into the hopper 11 thru a plate 14 slot 23 that closely conforms to those portions of the disc in such slot; and an emanant 24 and an entrant 25 shroud secured to the outer face of the plate. The shrouds 24, 25 are C-shaped in cross section and elongated transversely of such sections to provide slots 26, 27. The elongation of the emanant shroud 24 is such that it forms a spout, or chute, for carrying emenanting material beyond the shaft 15 so that when the material leaves the shroud it will fall outwardly of the shaft from the plate, it will not hit the shaft to be deflected thereby but will fall directly downward thru and out of the funnel 20. The elongation of the entrant shroud 25 is such that it forms a trap for material that leaks outwardly of the plate 14 adjacent the entrant portion of the disc. Rotation of the disc carries this trapped material back into the hopper. The angling of the elongation of the emanant shroud 24 outwardly and downwardly and of the entrant shroud 25 upwardly, as shown, is for achieving the above described functioning. Material is moved from the hopper between the teeth 28 formed in the peripheral face of the disc. These teeth, also, serve to return to the hopper material found in the entrant shroud 25.

Figure 1:
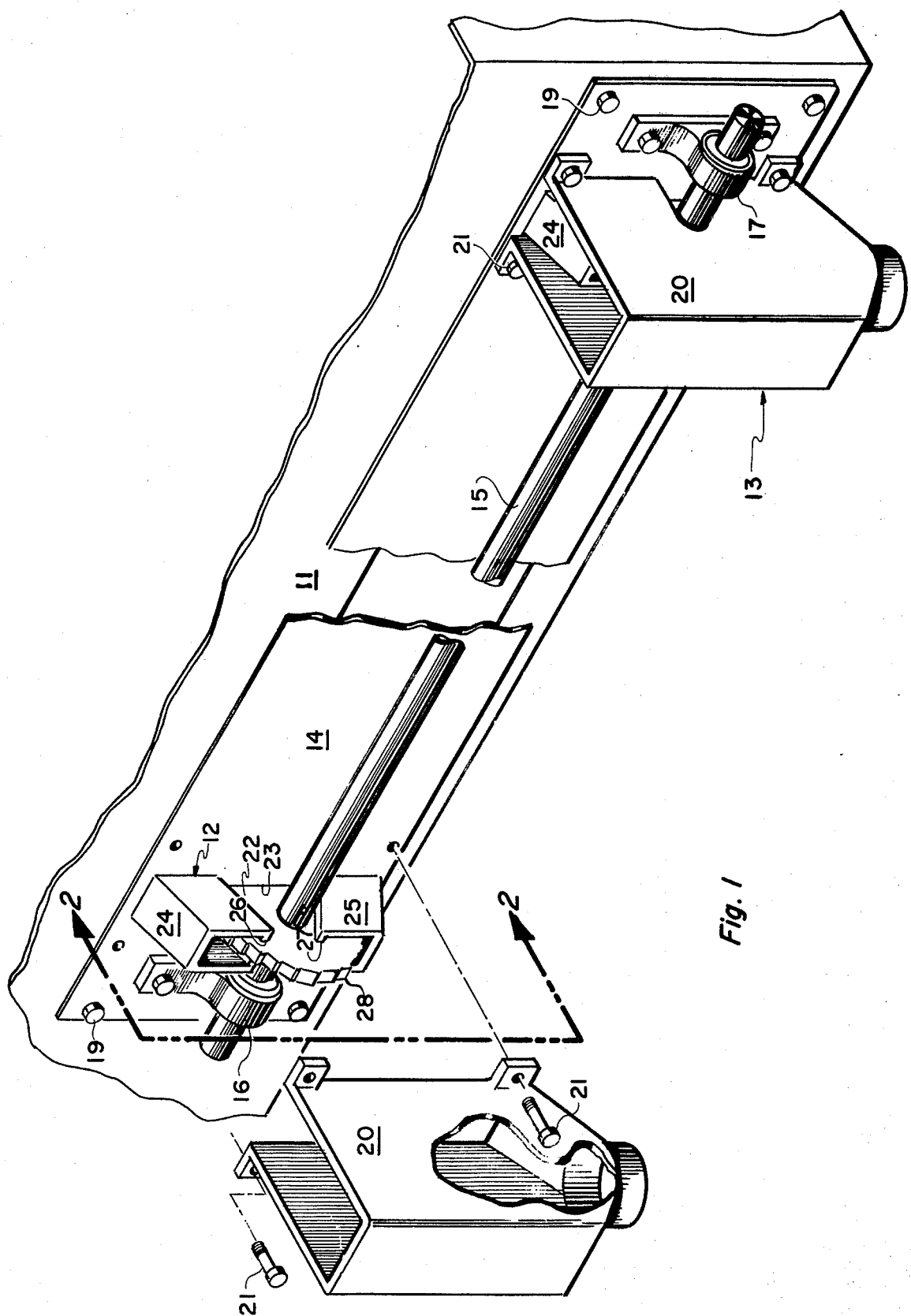
FIG. 1 is an isometric view of an embodiment of the present invention with two toothed discs, with most of the hopper broken away, and with one of the two disc's cover funnels displaced and partly broken away.
Figure 2:
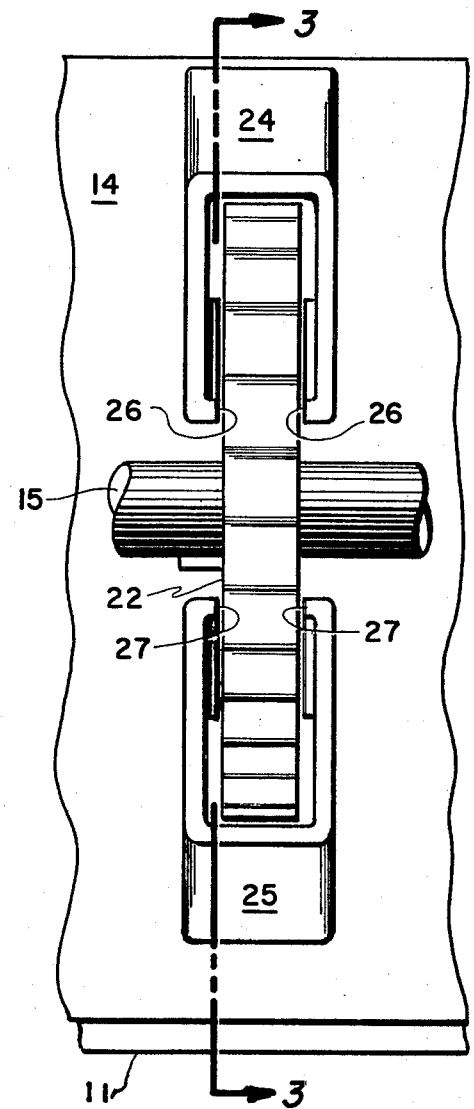
FIG. 2 is an elevational view taken on the line 2—2 of FIG. 1 with parts, other than those adjacent the disc, broken away.

The embodiment of the invention shown in isometric view in FIG. 1 has therein two peripherally toothed discs 22 rotatably mounted on the shaft 15 in spaced apart relationship. This spacing of the discs is that of the plant rows in a field ridge, or bed. Twelve inches is a common row spacing, with 36 inches between bed centers. Usually there is a separate hopper for each bed and as many hopper aligned side-by-side as the available equipment will carry, four or six is usual. Each dispensing unit 12, 13 has associated therewith, usually, equipment for placing the dispensed material below the ground surface. The shaft 15 is common to all of the aligned hoppers and their dispensing units, and is rotated by a wheel (not shown) in rolling contact with the ground.

Each of the peripherally toothed discs, when rotated so that its upper edge moves from the hopper, entrains material between its teeth 28 and carries such thru the plate slot 23 and outwardly thereof until the entrained material discharges by gravity downward thru the guard funnel 20. The emanant shroud 24 acts as a covered chute to direct outwardly delivery from the disc. The entrant shroud 25 traps material that there may leak outwardly of the hopper, and rotation of the disc returns the material to the hopper. Build up of material on the sides of the discs is minimized by the close fit of the discs in the plate slots 23 and the slots 26, 27 of the shrouds 24, 25.

With the hopper filled with granular systemic material, a 4 inch diameter disc having a ½ inch face (thickness) and 24 teeth will, upon rotation of 5 revolutions per minute, dispense 20 grams per minute; upon 20 rpm, dispense 80 grams per minute; and upon 100 rpm, dispense 375 grams per minute. With the hopper filled with fertilizer, finely ground, and a density of 51 pounds per cubic foot, the ½ inch faced 4 inch diameter disc will, upon rotation of 10 rpm, dispense 11 ounces per minute; and upon 100 rpm, dispense 6¼ pounds per minute. Wider faced discs will dispense greater amounts at such rpm.

Having described above the construction and operation of an embodiment of my invention, a device that will dispense small or large amounts of particulate material at uniform and definite rates, I claim:

1. In a dispenser of particulate material: a plate adapted to be part of a chamber wall, said chamber adapted to contain such material, said plate having formed therein a main slot, and a shroud attached to and extending from said plate to an extended and open end; said shroud having formed therein a branch slot angularly disposed to said main slot, said shroud being C-shaped in cross section along said branch slot and said branch slot and its edges being generated by the opposed ends of such C-shaped sections; and said slots adapted to receive closely therein and therethru a rotatable and peripherally toothed disc.

2. The combination of claim 1 in which said main and branch slots are continuous with each other and intersect.

3. The combination of claim 2 having therein two such shrouds so as to have a branch slot adjacent each end of said main slot.

4. The combination of claim 2 in which said branch slot intersects said main slot between the ends of said main slot.

5. Including with the combination of claim 1, a rotatable and peripherally toothed disc received closely in and thru said slots, a shaft axially of and rotatably supporting said disc, and shaft support means secured directly to said plate so as to support on said plate said disc and shaft; said shaft being between said plate and said extended end of said shroud, and said slots and disc being so proportioned relative to each other that the edges of said slots serve both to minimize the passage of such material between disc sides and slot edges and to clean from the sides of said disc material adhering thereto, as said disc rotates to dispense material thru said plate and from such a chamber.

6. Including with the combination of claim 3, a rotatable and peripherally toothed disc received closely in and thru said slots, a shaft axially of and rotatably supporting said disc, and shaft support means secured directly to said plate so as to support on said plate said disc and shaft; said shaft being between said plate and said extended ends of said shrouds, and said slots and disc being so proportioned relative to each other that the edges of said slots serve both to minimize the passage of such material between disc sides and slot edges and to clean from the sides of said disc material adhering thereto, as said disc rotates to dispense material thru said plate and from such a chamber.

* * * * *